United States Patent
Voss et al.

(10) Patent No.: US 11,015,259 B2
(45) Date of Patent: May 25, 2021

(54) PLASMA ELECTROLYTIC OXIDATION (PEO) COATED PEELABLE SHIMS

(71) Applicant: Shimco North America Inc., Cambridge (CA)

(72) Inventors: Peter Voss, Markham (CA); Stephen Forrest, Paris (CA); Kapilan Paramanathan, Markham (CA); Deoram Singh, Toronto (CA)

(73) Assignee: Voss Innovative Technologies Corporation, Cambridge (CA)

( * ) Notice: Subject to any disclaimer, the term of this patent is extended or adjusted under 35 U.S.C. 154(b) by 30 days.

(21) Appl. No.: 16/071,644

(22) PCT Filed: Feb. 15, 2017

(86) PCT No.: PCT/CA2017/050193
§ 371 (c)(1),
(2) Date: Jul. 20, 2018

(87) PCT Pub. No.: WO2017/139883
PCT Pub. Date: Aug. 24, 2017

(65) Prior Publication Data
US 2019/0003071 A1 Jan. 3, 2019

Related U.S. Application Data

(60) Provisional application No. 62/296,311, filed on Feb. 17, 2016.

(51) Int. Cl.
*B32B 7/06* (2019.01)
*B32B 7/12* (2006.01)
(Continued)

(52) U.S. Cl.
CPC .............. *C25D 11/026* (2013.01); *B32B 7/06* (2013.01); *B32B 7/12* (2013.01); *B32B 15/00* (2013.01);
(Continued)

(58) Field of Classification Search
CPC ..... C25D 11/026; C25D 11/18; F16B 11/006; F16B 43/00; B32B 15/00; B32B 15/017;
(Continued)

(56) References Cited

U.S. PATENT DOCUMENTS

| 4,526,641 A | 7/1985 | Schriever et al. |
| 6,085,414 A | 7/2000 | Swarbick et al. |

(Continued)

FOREIGN PATENT DOCUMENTS

| EP | 0667233 A1 * | 8/1995 | ............... B32B 7/06 |
| EP | 0667233 A1 | 8/1995 | |

(Continued)

OTHER PUBLICATIONS

Google Patent Translation of EP0667233A1 (Year: 2019).*
(Continued)

*Primary Examiner* — Michael Zhang
(74) *Attorney, Agent, or Firm* — Bereskin & Parr LLP

(57) ABSTRACT

A method for producing a laminated shim includes subjecting a shim stock to a plasma electrolytic oxidization (PEO) process to create a PEO shim, applying an adhesive layer of an adhesive to a surface of the PEO shim, stacking at least one other PEO shim onto the adhesive layer of the PEO shim to create a stack of PEO shims, and pressing the stack of PEO shims together to create a PEO coated peelable laminate.

6 Claims, 7 Drawing Sheets

(51) Int. Cl.
  *B32B 37/12* (2006.01)
  *B32B 15/00* (2006.01)
  *F16B 11/00* (2006.01)
  *B32B 15/01* (2006.01)
  *C25D 11/02* (2006.01)
  *F16B 43/00* (2006.01)
  *F16J 15/06* (2006.01)
  *C25D 11/18* (2006.01)

(52) U.S. Cl.
  CPC ............ *B32B 15/017* (2013.01); *B32B 37/12* (2013.01); *C25D 11/18* (2013.01); *F16B 11/006* (2013.01); *F16B 43/00* (2013.01); *F16J 15/06* (2013.01); *B32B 2255/06* (2013.01); *B32B 2255/20* (2013.01)

(58) Field of Classification Search
  CPC ..... B32B 37/12; B32B 37/06; B32B 2255/20; B32B 2255/06; F16J 15/06
  See application file for complete search history.

(56) References Cited

U.S. PATENT DOCUMENTS

| | | | |
|---|---|---|---|
| 6,896,785 B2* | 5/2005 | Shatrov | C25D 5/18 204/164 |
| 8,241,479 B2 | 8/2012 | Spoto et al. | |
| 8,337,689 B2 | 12/2012 | Yun et al. | |
| 8,518,839 B2 | 8/2013 | Gastel | |
| 8,808,522 B2 | 8/2014 | Lu et al. | |
| 8,808,523 B2 | 8/2014 | Lu et al. | |
| 8,828,215 B2 | 9/2014 | Blawert et al. | |
| 2005/0082699 A1 | 4/2005 | Dixon et al. | |
| 2007/0039826 A1 | 2/2007 | Chang et al. | |
| 2012/0031765 A1* | 2/2012 | Curran | B05D 3/142 205/50 |

FOREIGN PATENT DOCUMENTS

| | | | | |
|---|---|---|---|---|
| EP | 2147777 A1 * | 1/2010 | ........... | B29C 66/721 |
| EP | 2327541 A1 * | 6/2011 | ............ | B32B 15/00 |

OTHER PUBLICATIONS

MetalShims.com "Shim Plating/Finish," https://web.archive.org/web/20101227071758/https://www.metalshims.com/c-45-shim-plating-finish.aspx (Year: 2010).*
Espacenet Translation of EP-0667233-A1 (Year: 2019).*
Espacenet Translation of EP-2327541-A1 (Year: 2019).*
Curran et al.,"Thermo-Physical Properties of Plasma Electrolytic Oxide Coatings on Aluminium", Surface & Coatings Technology 199 (2005) 168-176.
International Searching Authority, "International Search Report and Written Opinion for PCT/CA2017/050193", dated Aug. 31, 2018.

* cited by examiner

PLASMA ELECTROLYTIC OXIDATION (PEO) COATED PEELABLE SHIMS

TECHNICAL FIELD

The embodiments disclosed herein relate to gap management manufacturing, and, in particular to surface bonded laminated shims for managing gaps.

BACKGROUND

Shims are thin, often tapered or wedge-shaped pieces of material that are used to fill small gaps or spaces between component parts such as assembly items. Shims may be of particular applicability in the aerospace and defense industries. During manufacturing assembly, close gaps may be created when multiple components are assembled because of manufacturing tolerances.

The tolerances between component parts may create a varied thickness of gaps. Laminated shims may be used to fill these gaps. Laminated shims are stacks of shims that are adhered together that may be peelably separated based on the particular thickness of the gap. Shims may be full surface bonded laminated shims, edge bonded shims, tapered shims, solid shims, or machined parts. However, conventional laminated shims may not provide desirable material properties on all layers of the laminated shim. Where the shims do not have the same level of quality of properties of the surrounding components, the shim may become the weakest link in the assembly. Accordingly, there is a need for an improved laminated shim.

SUMMARY

According to some embodiments, there is a method for producing a laminated shim including subjecting a shim stock to a plasma electrolytic oxidization (PEO) process to create a PEO shim, applying an adhesive layer of an adhesive to a surface of the PEO shim stacking at least one other PEO shim onto the adhesive layer of the PEO shim to create a stack of PEO shims, and pressing the stack of PEO shims together to create a PEO coated peelable laminate.

The shim stock may be aluminum, magnesium, titanium, or an alloy thereof. The PEO shim may include corundum on aluminum, spinel on magnesium, or rutile on titanium.

The adhesive may have a chemical composition that is selected to provide a peel strength appropriate for the stack of PEO coated shims. The adhesive may include a resin, a hardener, and acetone. The adhesive may include a resin to hardener to acetone ratio of approximately 1:3:6. The adhesive may be sprayed or rolled onto the PEO shim. The adhesive may provide a peel strength of between one and five pounds per linear inch.

The PEO shim may have a thickness of 0.001 inch to 0.010 inch. The PEO coated peelable laminate may be semi-solid, half-solid, or three-quarter solid.

The method may include receiving the sheet of shim stock on a coil, uncoiling the sheet of shim stock, and cutting the sheet of shim stock to a desired length after subjecting the shim stock to the PEO process. The method may include testing the PEO coated peelable laminate for peel strength and water immersion. The method may include cutting the PEO laminate to a desired design that includes internal and external perforations. The method may include peeling, by hand, a layer of PEO shim off of the PEO coated peelable laminate.

According to some embodiments, there is a laminated shim includes first and second sheets of plasma electrolytic oxidization (PEO) shim stock, each having upper and lower planar surfaces, PEO layers on each of the upper and lower planar surfaces of the first and second PEO shims, and an adhesive layer of an adhesive on the PEO layers and between the first and second sheets for adhering the first and second sheets of PEO shim stock together.

The PEO shim stock may include any one of PEO layers of corundum on aluminum, or PEO layers of spinel on magnesium, or PEO layers of rutile on titanium. The adhesive includes resin, hardener, and acetone. The adhesive may be adhered such that the first sheet of PEO coated shim stock is peelably removable from the second sheet of PEO coated shim stock. The laminated shim may include a plurality of further sheets of the PEO coated shim stock stacked with the first and second sheets of PEO coated shim stock, wherein each of the plurality of further sheets of the PEO coated shim stock has an adhesive layer therebetween. The first and second sheets of PEO coated shim stock may each have a thickness of 0.001 inch to 0.010 inch. The laminated shim may include a semi-solid, half-solid, or three-quarter solid layer of PEO material. The layer of the adhesive may have a thickness that is less than the thickness of the first or second sheet of PEO coated shim stock.

Other aspects and features will become apparent, to those ordinarily skilled in the art, upon review of the following description of some exemplary embodiments.

BRIEF DESCRIPTION OF THE DRAWINGS

The drawings included herewith are for illustrating various examples of articles, methods, and apparatuses of the present specification. In the drawings.

DETAILED DESCRIPTION

Figure 1:
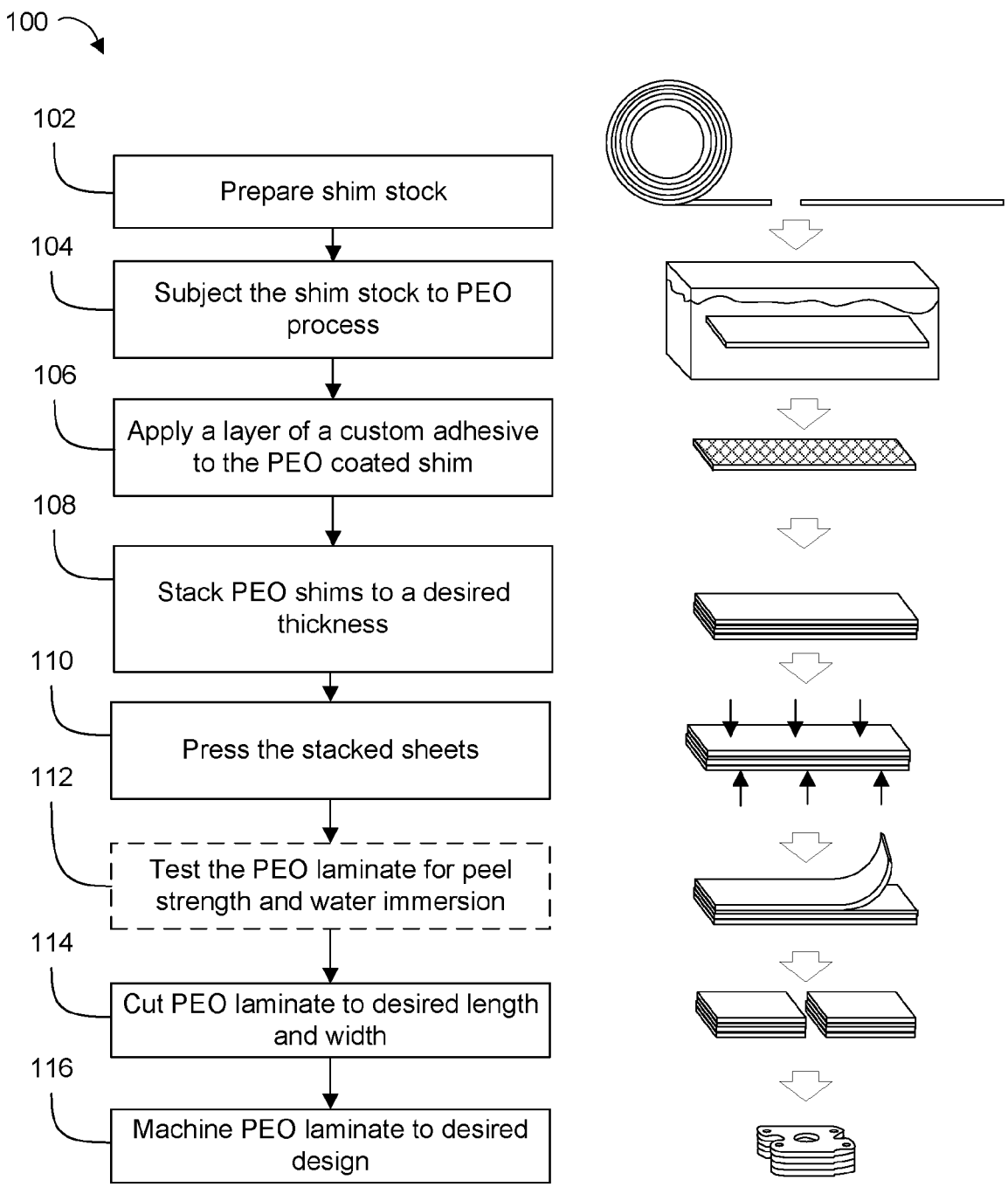
FIG. 1 is a flow chart of a method for producing a laminated shim, in accordance with an embodiment.

Referring to FIG. 1, illustrated therein is a method 100 for producing a laminated shim, in accordance with an embodiment.

At 102 a shim stock to be coated is received and prepared. In an embodiment, the shim stock is a metal alloy. More particularly, the shim stock may be aluminum, magnesium, or titanium and a wide range of their alloys. The applicable type, class and nominal size of the shim stock may be as specified in Table I (from Shim Stock Laminated Standard MIL-DTL-22499D) or as otherwise desired.

In particular embodiments, the shim stock may be aluminum 1100, conforming to AMS QQ-A-250/1 (processed to temper H19, with a minimum tensile strength of 24.0 ksi) or from aluminum alloy 5052, conforming to AMS QQ-A-250/8 (processed to temper H19 or H39, with a minimum tensile strength of 42.0 ksi). The shim stock may be an aluminum alloy conforming to AMS QQ-A-250/5 (alclad 2024) tempers T3, T4, T81 or T861 for use with AMS QQ-A-250/1 laminates; AMS QQ-A-250/8 (5052) tempers H32 or H34 for use with AMS QQ-A-250/8 laminates. The shim stock may be brass conforming to UNS C26000 of ASTM B 36 or UNS C33500 of ASTM B 121, H01 temper or harder (ASTM B 601). The shim stock may be a corrosion resisting steel conforming to AMS 5516, AMS 5903, AMS 5904, AMS 5905, or AMS 5906, Type 202, annealed condition or harder. The shim stock may be carbon steel conforming to QQ-S-698, temper annealed or harder. The shim stock may be titanium alloy conforming to MIL-T-9046, (CP-1 annealed condition or harder). The shim stock may be titanium alloy sheet conforming to MIL-T-9046 (AB-1 annealed condition). The shim stock may be particular alloys for aerospace applications. The PEO process is not limited to these metals.

The shim stock may be received as a metal foil on a coil where the coil is placed onto a coating machine to unroll the coil. The coils may weigh up to 10,000 lbs each. The shim stock has a thickness of 0.001 inch to 0.010 inch. More particularly, the thickness of the shim stock may be 0.002 inch or 0.003 inch and widths of 25 inch. The unrolled metal foil is cut into sheets of shim stock. The coil may be cut into approximately 49 inch lengths.

At 104, the shim stock is subjected to a Plasma Electrolytic Oxidation (PEO) process to create a sheet of PEO coated shim stock, a PEO shim, or a roll of PEO shim stock. The sheets of shim stock are dipped into a PEO solution, power is applied to the PEO solution, and the sheets of shim stock are coated with PEO. The PEO coating surface layer can be grown to about 130 um on aluminum, for example. The typical thickness of the PEO coating surface layer is very thin and may not put the finished part out of tolerance.

In an embodiment, the shim stock may be coated in a continuous roll application process, such that the coil is unrolled, PEO coated, then re-rolled.

The PEO coating 104 may be a plasma-assisted anodizing process in environmentally safe, alkaline electrolyte that is free of Cr, heavy metals, volatile organic compounds and strong acids. PEO is primarily a conversion of the substrate. PEO, also known as microarc oxidation (MAO), is an electrochemical surface treatment process for generating oxide coatings on metals. PEO process can be used to grow thick (tens or hundreds of micrometers), crystalline, oxide coatings on metals such as aluminum, magnesium and titanium. PEO coating is a chemical conversion of the substrate metal into its oxide, and grows both inwards and outwards from the original metal surface. Because it is a conversion coating, rather than a deposited coating (such as a coating formed by plasma spraying), PEO coating has high adhesion to the substrate metal. A range of substrate alloys can be coated, including wrought aluminum alloys and cast alloys. While various metals may be coated with PEO, conventional methods do not suggest the desirability of PEO coating shims or how PEO treatment would be applied to peelable shims. The PEO process 104 may transform the surface layer of the shim stock into materials such as corundum on aluminum, spinel on magnesium, and rutile on titanium.

Metals such as aluminum naturally form a passivating oxide layer when exposed to oxygen which provides moderate protection against corrosion. The passivating oxide layer is adherent to the metal surface and will regrow if removed. In conventional anodizing, the passivating oxide layer is grown on the surface of the metal is immersed in an acidic electrolyte and electrical potential is applied to the metal.

In a PEO process, higher electrical potentials are applied than those in conventional anodizing. For example, in the plasma electrolytic oxidation of aluminum, the electrical potential is at least 100 V. This locally exceeds the dielectric breakdown potential of the growing oxide film, and discharges occur. These discharges result in localized plasma reactions, with conditions of high temperature and pressure which modify the growing oxide. Processes include melting, melt-flow, re-solidification, sintering and densification of the growing oxide. The oxide is partially converted from amorphous alumina into crystalline forms such as corundum ($\alpha$-Al2O3) which is much harder. As a result, mechanical properties such as wear resistance and toughness are enhanced. Toughness is the ability of a material to absorb energy and plastically deform without fracturing.

In an embodiment, the shim stock is immersed in a bath of electrolyte such as a dilute alkaline solution (e.g. KOH). The shim stock is electrically connected, so as to become one of the electrodes in an electrochemical cell, with the other counter-electrode typically being made from an inert material such as stainless steel, for example, the wall of the bath itself. Potentials of over 100 V are applied between these two electrodes. These may be continuous or pulsed direct current (DC) (in which case the part is simply an anode in DC operation), or alternating pulses (alternating current or pulsed bi-polar operation) where the stainless steel counter electrode might just be earthed.

On aluminum, the coating properties can vary according to the exact alloy composition. For instance, hard coatings can be achieved on 2XXX series aluminum alloys, where a high proportion of crystalline phase corundum ($\alpha$-Al2O3) is formed, resulting in hardnesses of approximately 2000 HV, whereas coatings on the 5XXX series have less of this important constituent and are hence softer.

The coating properties are dependent on the substrate used, as well as on the composition of the electrolyte and the electrical regime used. The PEO shim may have a number of different properties including: strong adhesion, fatigue performance, thermal management, clean technology, strain tolerance, chemical stability, electrical insulation, extreme hardness, process versatility, and wear resistance.

At 106, an adhesive layer of a preselected adhesive is applied to a planar surface of the PEO coated shims. The adhesive is prepared and mixed. The adhesive may include a resin, a hardener, and acetone. The adhesive may be different from conventional glues as the shim is PEO treated. Applying the adhesive to the PEO shim is different from conventional methods as the surface of the PEO shim is more porous than pure aluminum, magnesium, or titanium.

The adhesive has a chemical composition that is selected to provide suitable properties when applied between layers of the PEO shims. In particular, the adhesive has a chemical composition that is selected to provide a peel strength appropriate for the stack of PEO coated shims. For example, the adhesive provides a peel strength between one pound per inch and five pounds per inch.

In an embodiment, different ratios of resin, acetone and hardener may be used while maintaining appropriate adhesion. In an embodiment, the adhesive is water based. In an embodiment, the adhesive is epoxy based. In an embodiment, the adhesive includes double sided tape. In an embodiment, the adhesive is heat activated. In an embodiment, the adhesive is pressure activated. The adhesive may be cold press activated. In an embodiment, the adhesive hardens over a period time (e.g. 2 weeks).

In an embodiment, the adhesive may be made of a heat-activated glue (epoxy based), acetone, and hardener. The adhesive may have a resin to hardener to acetone ratio of approximately 1:3:6. For example, the adhesive may be 0.100 lb. resin, 0.200 lb. hardener, and 0.600 lb. acetone.

At 106, a thin layer of the adhesive is applied to the surface of each layer of the PEO shims. For example, the adhesive is applied using a Mayer rod, by spraying, by squeegee, or by rolling.

At 108, at least one other PEO shim is stacked onto the adhesive layer of the PEO shim to create a stack of PEO shims. The PEO shims and adhesive layers are stacked in layers of two or more to a desired thickness. For example, PEO shims of thickness 0.002 inch are stacked to total laminate thickness of 0.010 inch. A common thickness is 0.080 inch, which is 40 layers of 0.002 inch. One or more of the PEO shims in the stack may have a thickness greater than that of at least one other PEO shim. In an embodiment, a base sheet is thicker than the other sheets. Once stacked, the stack of PEO shims is allowed to cure.

The PEO shim may be semi-solid, for example, half-solid or three-quarter solid, depending on the ratio of solid section to total thickness. A semi-solid PEO shim may add rigidity to a design by meeting the performance requirements of a thicker, solid shim. The semi-solid PEO shim may provide a bearing surface on one side, yet allow adjustments to the overall thickness of the PEO shim by enabling the user to peel off unwanted layers from the other side.

Figure 3:
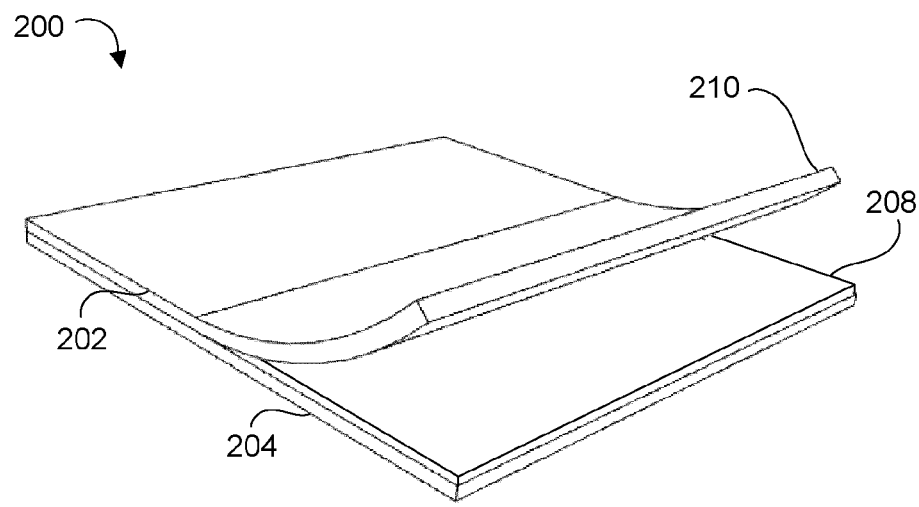
Figure 4:
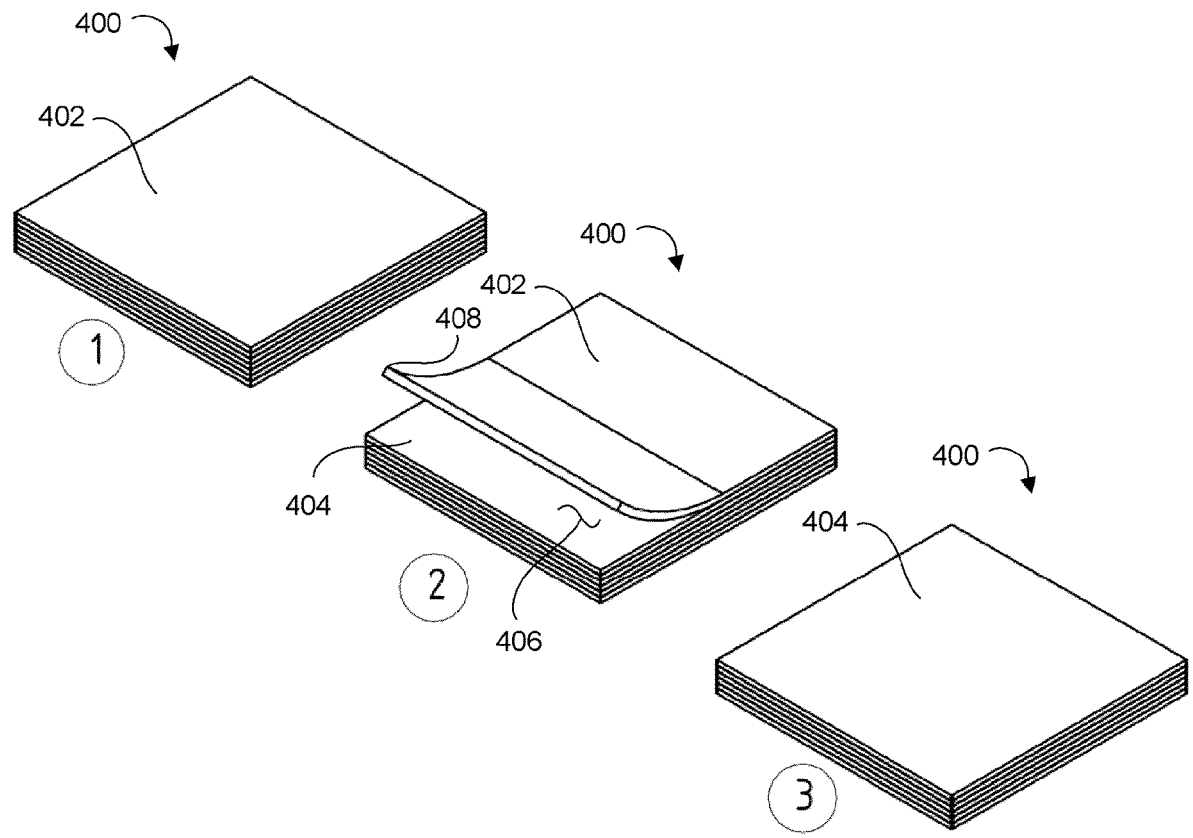
FIG. 4 is a laminated shim having a layer removed, in accordance with an embodiment.

At 110, the stack of PEO shims is placed under a press for a given amount of time to form a PEO coated peelable laminate (e.g., PEO laminate 200 of FIG. 3, or PEO laminate 400 of FIG. 4). The press may be a cold or heat press. The press activates the adhesive and the pressure forces the air out between the PEO shims. The heat press applies a high pressure and low heat to the PEO laminate. The high pressure and low heat melts the adhesive and adheres the PEO shims together. The bonding strength may be between one and five pounds per linear inch and may vary by the particular use of the PEO shims. The press is cooled and the PEO laminate is removed from the press.

The adhesive may provide an acceptable peel strength with no visible residue left behind. The gluing and stacking lamination procedure may be automated. The PEO laminate has PEO surface treatment on each layer of the PEO laminate as opposed to only the most outer layer. As such, the PEO laminate may provide desired PEO material properties regardless of the thickness of the PEO laminate.

A desired number of layers of PEO shim may be peeled, by hand, off of the PEO coated peelable laminate. The PEO laminate may be bonded together throughout the whole surface area in a manner which will permit peeling of the laminations for adjustment of the shim thickness without separation of the remaining laminations and solid parts. The PEO laminate may be capable of being cut, using suitable tools, without separation and may remain intact with normal handling.

Optionally, at 112, quality tests are performed on the PEO laminate. The test sample may include two 1 inch by 12 inch strips of the PEO laminate. The test strips of the PEO laminate may be allowed to stand for a minimum period of 8 hours following manufacture or until complete cure, whichever comes first, before being tested.

The quality tests may include a peel strength test, where a sample PEO shim is removed from the PEO laminate and the strength of the adhesive is measured in peel strength. For example, each PEO shim may have a peel strength no less than one pound per inch of width and no more than five pounds per inch of width, except at the solid-laminate bond line which may be higher. In certain embodiments, each individual PEO shim may have a peel strength no less than ½ pound per inch of width and no more than 2½ pounds per inch of width, except at the solid-laminate bond line which may be higher. The number of peels per sample may be in accordance with Table II.

At 112, the quality tests may also include a water immersion test performed on the PEO laminate. The water emersion test includes placing the PEO laminate into an aqueous solution to test whether the adhesive will hold. The PEO laminate may be capable of withstanding total immersion in water at a temperature of 120° F.±5° F. for a period of 3 hours without separation of PEO shims. At the end of the test period, the PEO laminate may be examined to determine proper adhesion quality.

At 114, the PEO laminate is cut to desired length and width for further processing. For example, the edges of the PEO laminate may be trimmed (e.g. to a 24 inch×48 inch laminated sheet). At 116, the PEO laminate is machined to a desired design. For example, the PEO laminate may be placed in a CNC machine and cut to meet a given engineering drawing to create a PEO coated peel able laminate (e.g. PEO shim 1000 of FIG. 10). The PEO laminate may have internal perforations and an external profile.

Figure 2:
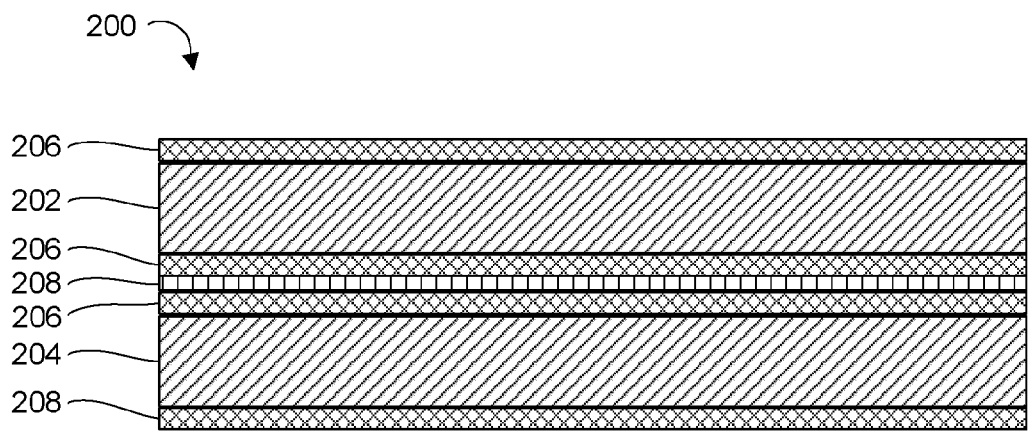
FIGS. 2 and 3 are side profile and perspective views, respectively, of a laminated shim, in accordance with an embodiment.

Referring now to FIGS. 2 and 3 (which are not to scale), illustrated therein is a PEO coated peelable laminate 200, in accordance with an embodiment. The PEO coated peelable laminate 200 may be made from the method 100. The PEO coated peelable laminate 200 includes a first PEO shim 202 and at least one additional PEO shim 204. The PEO shims 202, 204 have, for example, a thickness in the range of 0.001 inches to 0.010 inches. More particularly, the PEO shims 202, 204 may be of 0.002 or 0.003 inches. Further, the PEO shims 202, 204 may be semi-solid, for example, half-solid or three-quarter solid. Each of the PEO shims 202, 204 include PEO layers 206 on both upper and lower planar surfaces of the PEO shims 202, 204. The PEO layers 206 may have a thickness of 1 micron and may depend on the particular PEO properties desired for the application of the PEO shim.

The PEO coated peelable laminate 200 has an adhesive layer 208 of the adhesive on the PEO layer 206 between the first PEO shim 202 and the second PEO shim 204. The adhesive layer 208 adheres the PEO layers 206 of the first shim 202 and the second shim 204 together. The adhesive may include a resin, a hardener, and acetone. In an embodiment, the thickness of the adhesive layer between PEO shims 202, 204 is less than the thickness of a PEO shim 202, 204 and more particularly less than or equal to 0.0003 inches.

When it is desirable to reduce the thickness of the PEO coated peelable laminate 200, the first PEO shim 202 may be removed from the PEO laminate 200 by peeling the PEO shim 202 at edge 210. The first PEO shim 202 may peel away by hand, without breaking, to leave the PEO coated peelable laminate 200, thinner than before while still having the PEO layer 206 on all surfaces of the PEO laminate 200.

FIG. 4 illustrates a PEO coated peelable laminate 400 having a PEO shim removed, in accordance with an embodiment. The PEO coated peelable laminate 400 may be made from method 100. The PEO coated peelable laminate 400 includes a first PEO shim 402 and a plurality of additional PEO shims 404. The plurality of further shims 404 are stacked with the first PEO shim 402. The PEO coated peelable laminate 400 has an adhesive layer on the surfaces 406 between the PEO shims 402, 404. Each of the plurality of further PEO shims 404 has the adhesive layer 406 therebetween. In an embodiment, the thickness of the adhesive layer of the adhesive between PEO shims 402, 404 may not exceed 0.0003 inches.

When it is desirable to reduce the thickness of the PEO coated peelable laminate 400, the first PEO shim 402, or a first plurality of PEO shims may be removed by peeling at edge 408. The first PEO shim 402 or a first plurality of PEO shims may peel away without breaking to leave the PEO coated peelable laminate 400, thinner than before. Each or a first plurality of PEO shims shim 402, 404 is PEO coated on both sides, such that the PEO coating properties will exist on the surfaces 406 between the shims 402, 404 regardless of the thickness of the PEO coated peelable laminate 400.

The PEO coated peelable laminate 400 can be peeled, by hand, one PEO shim 402 at a time as shown, or multiple PEO shims at a time, without tearing. The number of PEO shims 402, 404 to remove may be determined by the user's requirement. For example, in for the PEO coated peelable laminate 400 of FIG. 4, initially there are seven PEO shims in the PEO laminate 700 that are reduced to six PEO shims in the PEO laminate 700.

The metallic, solid, and peelable shims 200, 400 made of aluminum, magnesium, and titanium may be used in aerospace applications and meet aerospace industry standards and specifications. The PEO shims 200, 400 may provide a variety of aluminum, magnesium, and titanium products for aerospace with enhanced performance characteristics. The PEO method 100 may be environmentally-friendly and/or cost-effective as compared to traditional surface treatments. The PEO method 100 may be tailored to provide differing performance characteristics at different points on a component and be an enabling and flexible method. The method 100 may provide distinguishing advantages and solutions to problems that resulted when the metallic shims were PEO treated and then processed to become peelable.

Figure 5:
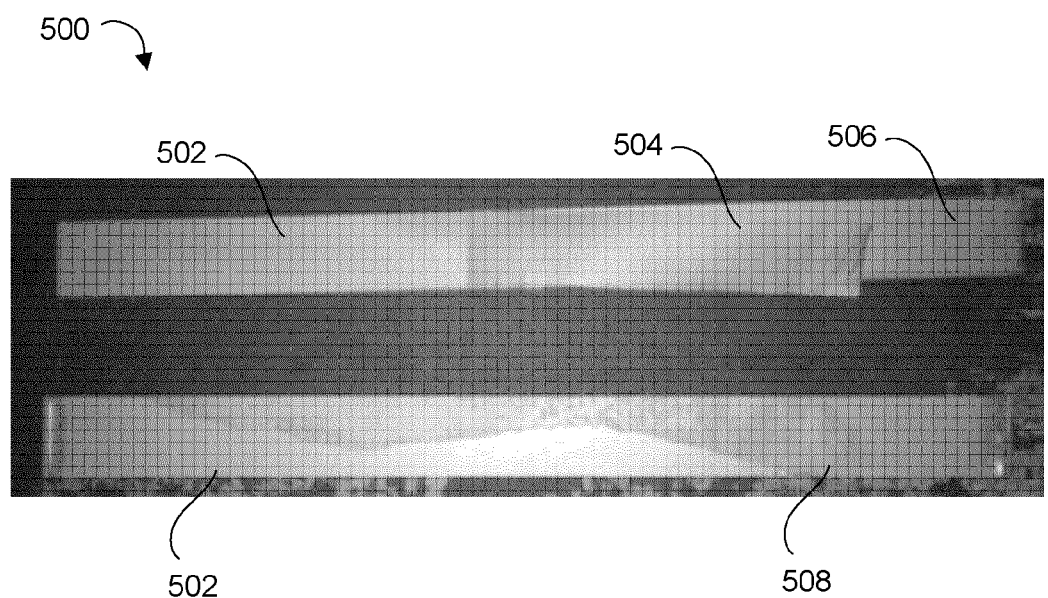
FIG. 5 is an image of a first test sample of a laminated shim.

FIG. 5 illustrates a first test sample 500 of a PEO coated peelable laminate 502. To make the test sample 500, glue was applied using a squeegee to the PEO shim. The PEO laminate 502 had glue applied to the surface of both sides to simulate a glue rolling machine. The PEO shim 502 had a 1 inch×0.016 inch strip of 2024T3 ALCLAD QQ-A-250/5 having two 2 inch×0.003 inch aluminum 1100 H19 applied thereto (504, 506). The glue used included 2.8 lb. of resin, 1.0 lb. of hardener, and 3.9 lb. of acetone. The press was set to a temperature of 330° F. and a pressure of 1500 lb. The first test sample 500 was pressed for 35 minutes. The first test sample 500 had persistent air bubbles (at 508) and a very high peel strength beyond the limits of the peel strength machine. The test sample also resulted in tearing.

Figure 6:
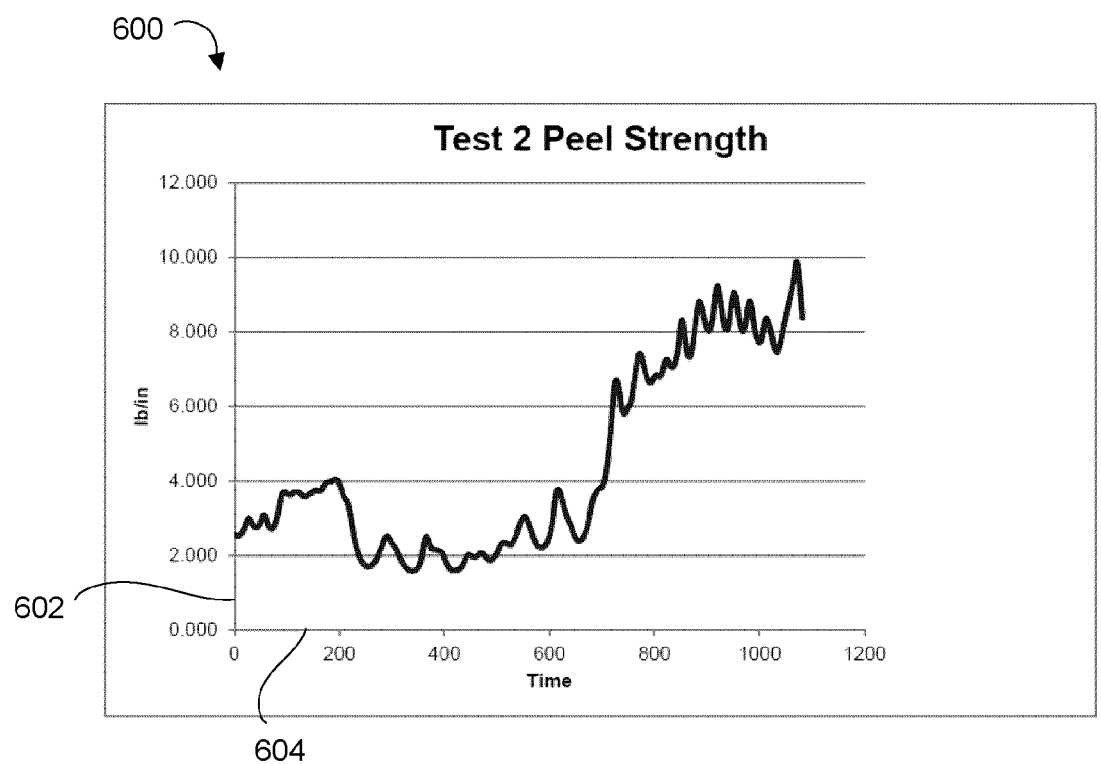
FIG. 6 is a chart of peel strength for a second test sample of a laminated shim.

FIG. 6 illustrates a chart 600 of test results for a second test sample of PEO laminate showing peel strength 602 versus time 604 (in seconds). Glue was applied to the PEO coated shim using a cloth. The second test sample had a PEO shim of a 0.016 inch layer of 2024T3 ALCLAD QQ-A-250/5, a 0.003 inch layer of aluminum 1100 H19, and a 0.003 inch layer of aluminum 1100 H19 without glue. The glue included 0.100 lb. of resin, 0.200 lb. of hardener, and 0.600 lb. of acetone. The press was set to a temperature of 330° F. and a pressure of 1500 lb. The second sample was pressed for 35 minutes. As seen from FIG. 6, the second sample had a peel strength between one and ten pounds per linear inch.

Figure 7A:
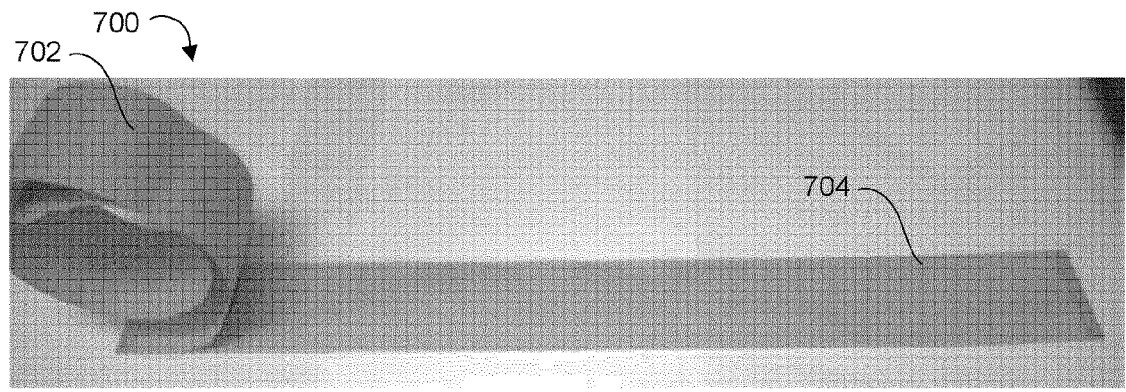
FIGS. 7A and 7B are images of a third test sample of a laminated shim.
Figure 7B:
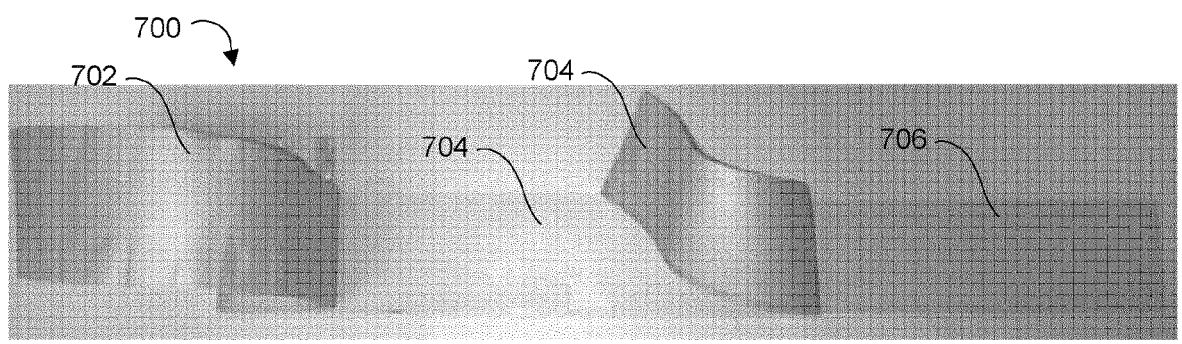
Figure 8:
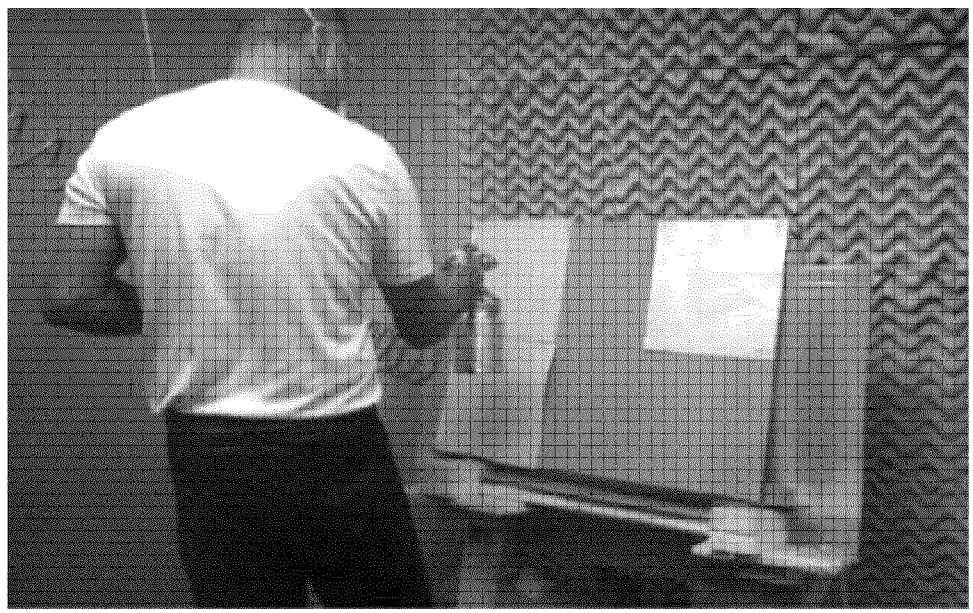
FIG. 8 is an image of a method for applying an adhesive to a PEO coated material.
Figure 9:
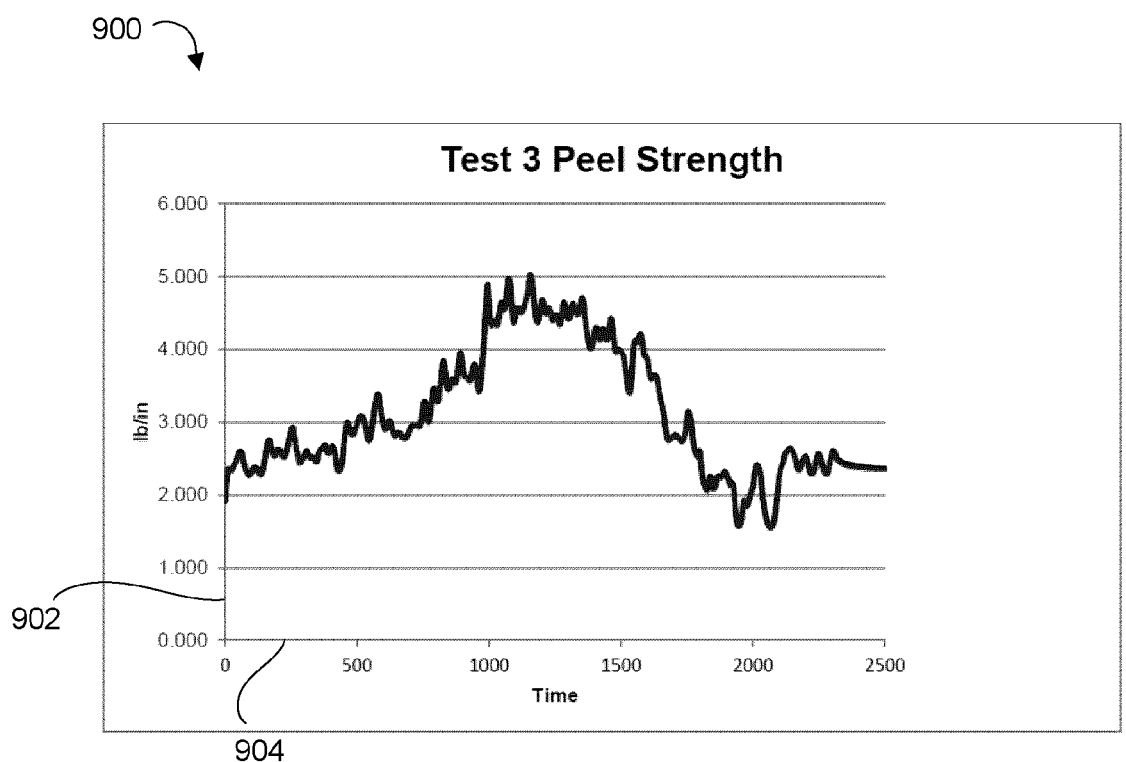
FIG. 9 is a chart of peel strength for the third test sample of FIGS. 7A and 7B.

FIGS. 7A and 7B illustrate a third test sample 700 of a PEO coated peelable laminate prepared e.g. using method 100. The test sample 700 includes a first PEO shim layer 702 of 0.002 inch, a second PEO shim layer 704 of 0.003 inch, and a third PEO shim layer 706 of 0.003 inch. To make the third test sample 700, adhesive was sprayed onto the PEO coated shim as shown in FIG. 8. FIG. 9 illustrates a chart 900 of test results for the third test sample 700 showing peel strength 902 versus time 904. The third test sample 700 had a composition of the adhesive of 0.100 lb. of resin, 0.200 lb. of hardener, and 0.600 lb. of acetone. The press was set to a temperature of 330° F. and a pressure of 1500 lb. The third test sample 700 was pressed for 35 minutes. The third test sample 700 split where the 0.002 inch PEO shim and the 0.003 inch PEO shim were glued together. As seen from FIG. 9, the third sample had a peel strength between one and five pounds per linear inch.

Figure 10:
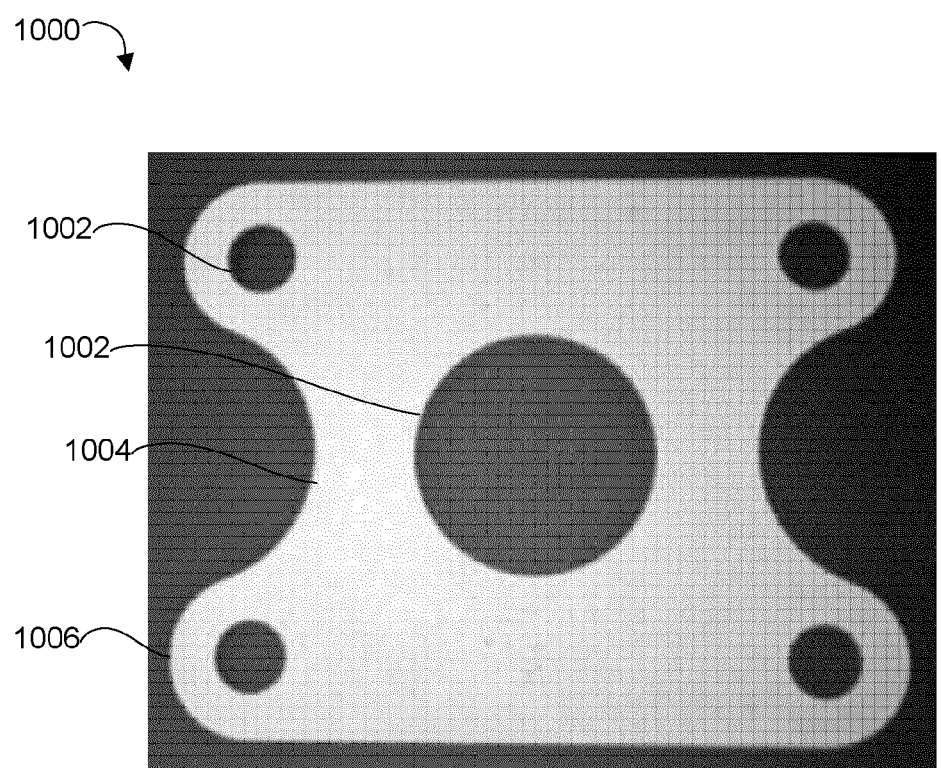
FIG. 10 is an image of a PEO coated peelable shim having a machined profile.

FIG. 10 illustrates a punched PEO coated peelable laminate 1000. The PEO coated peelable laminate 1000 includes various internal perforations 1002 (e.g., punches/holes) and external perforations, such as concave edges 1004 and convex rounded edges 1006.

While the above description provides examples of one or more apparatus, methods, or systems, it will be appreciated that other apparatus, methods, or systems may be within the scope of the claims as interpreted by one of skill in the art.

TABLE I

Construction and Dimensions

| | Class 1 (.002) | | Class 1 (.003) | |
|---|---|---|---|---|
| Nominal Thickness Inch | Type I Applicable Compositions | Type II Applicable Compositions | Type I Applicable Compositions | Type II Applicable Compositions |
| .006 | 1.2.3.4 | | 1.2.3.4 | |
| .008 | 1.2.3.4.6 | | | |
| .010 | 1.2.3.4.6 | | | |
| .012 | 1.2.3.4.6 | | 1.2.3.4.6 | |
| .015 | 1.2.3.4.5.6 | | 1.2.3.4.5.6 | |
| .016 | 1.2.3.4.5.6 | | 1.2.3.4.5.6 | |
| .020 | 1.2.3.4.5.6 | | 1.2.3.4.5.6 | |
| .021 | 1.2.3.4.5.6 | | 1.2.3.4.5.6 | |
| .032 | 1.2.3.4.5.6 | | 1.2.3.4.5.6 | |
| .033 | 1.2.3.4.5.6 | | 1.2.3.4.5.6 | |
| .048 | 1.2.3.4.5.6 | | 1.2.3.4.5.6 | |
| .062 | 1.2.3.4.5.6 | 1.2 | 1.2.3.4.5.6 | 1.2 |
| .063 | 1.2.3.4.5.6 | 1.2 | 1.2.3.4.5.6 | |
| .078 | 1.2.3.4.5.6 | 3 | 1.2.3.4.5.6 | |
| .080 | 1.2.3.4.5.6 | 3 | 1.2.3.4.5.6 | |
| .093 | 1.2.3.4.5.6 | 1.2 | 1.2.3.4.5 6 | 1.2 |
| .094 | 1.2.3.4.5.6 | 1.2 | 1.2.3.4.5.6 | 1.2 |
| .109 | 5.6 | | 5.6 | 1 |
| .121 | 5.6 | 1 | 5.6 | 1 |
| .125 | 1.2.3.4.5.6 | 1.2.3.4 | 1.2.3.4.5.6 | 1.2.3.4 |
| .156 | 1.2.3.4 | | 1.2.3.4 | |
| .186 | 1.2.3.4 | 1.2 | 1.2.3.4 | 1.2 |
| .187 | 1.2.3.4 | 1.2 | 1.2.3.4 | 1.2 |
| .190 | 1.2.3.4 | 1.2 | 1.2.3.4 | 1 |
| .250 | 1.2.3.4 | | 1.2.3.4 | |
| .251 | 1.2.3.4 | | 1.2.3.4 | |
| .375 | 1.2.3.4 | | 1.2.3.4 | |
| .376 | 1.2.3.4 | | 1.2.3.4 | |

TABLE II

| Peel Determination | |
| --- | --- |
| SAMPLE | MINIMUM NUMBER OF PEELS |
| 8 or more foil layers | 5 |
| 7 layers | 4 |
| 6 layers | 3 |
| 5 layers | 2 |
| 4 layers | 1 |
| 3 or less foil layers | 0 |

The invention claimed is:

1. A laminated shim comprising:

first and second sheets of plasma electrolytic oxidization (PEO) shim stock, each sheet having upper and lower planar surfaces, each upper and lower planar surface having a PEO layer thereon; and an adhesive layer of an adhesive on the PEO layers and between the first and second sheets for adhering the first and second sheets of PEO shim stock together, the adhesive including a resin, a hardener and an acetone and having a resin to hardener to acetone ratio of 1:3:6 by weight.

2. The laminated shim of claim 1, wherein the PEO shim stock includes any one of PEO layers of corundum on aluminum, or PEO layers of spinel on magnesium, or PEO layers of rutile on titanium.

3. The laminated shim of claim 1, wherein the adhesive is adhered such that the first sheet of PEO shim stock is peelably removable from the second sheet of PEO shim stock.

4. The laminated shim of claim 1 further comprising:

a plurality of further sheets of the PEO shim stock stacked with the first and second sheets of PEO shim stock, wherein each of the plurality of further sheets of the PEO shim stock has the adhesive layer therebetween.

5. The laminated shim of claim 1, wherein the first and second sheets of PEO shim stock each have a thickness of 0.001 inch to 0.010 inch.

6. The laminated shim of claim 1, wherein the layer of the adhesive has a thickness that is less than a thickness of the first or second sheet of PEO shim stock.

* * * * *